United States Patent
Wille et al.

(10) Patent No.: US 10,437,524 B2
(45) Date of Patent: Oct. 8, 2019

(54) PUF BASED BOOT-LOADING FOR DATA RECOVERY ON SECURE FLASH DEVICES

(71) Applicant: NXP B.V., Eindhoven (NL)

(72) Inventors: Thomas Wille, Hamburg (DE); Bruce Murray, Hamburg (DE)

(73) Assignee: NXP B.V., Eindhoven (NL)

(*) Notice: Subject to any disclaimer, the term of this patent is extended or adjusted under 35 U.S.C. 154(b) by 57 days.

(21) Appl. No.: 15/782,292

(22) Filed: Oct. 12, 2017

(65) Prior Publication Data

US 2019/0114115 A1    Apr. 18, 2019

(51) Int. Cl.
| | |
|---|---|
| G06F 3/06 | (2006.01) |
| G06F 12/02 | (2006.01) |
| G11C 16/06 | (2006.01) |
| G06K 19/07 | (2006.01) |
| H04L 9/08 | (2006.01) |
| G06F 21/12 | (2013.01) |
| H04L 9/32 | (2006.01) |

(52) U.S. Cl.
CPC ........ G06F 3/0679 (2013.01); G06F 12/0246 (2013.01); G06F 21/123 (2013.01); G06K 19/0723 (2013.01); G11C 16/06 (2013.01); H04L 9/0866 (2013.01); H04L 9/0877 (2013.01); H04L 9/3278 (2013.01); *G06F 2221/2103* (2013.01); *G06F 2221/2129* (2013.01)

(58) Field of Classification Search
CPC .. G06F 3/0679; G06F 12/0246; G06F 21/123; G06K 19/0723; G11C 16/06; H04L 9/0877
See application file for complete search history.

(56) References Cited

U.S. PATENT DOCUMENTS

| | | |
|---|---|---|
| 8,868,923 B1 | 10/2014 | Hamlet et al. |
| 2010/0250936 A1 | 9/2010 | Kusakawa et al. |
| 2013/0010957 A1 | 1/2013 | Yu et al. |
| 2015/0317481 A1* | 11/2015 | Gardner ............... H04L 9/3278 726/2 |
| 2016/0110571 A1* | 4/2016 | Jung ..................... G06F 21/602 340/10.1 |

FOREIGN PATENT DOCUMENTS

| | | |
|---|---|---|
| EP | 1 783 614 A1 | 5/2007 |
| EP | 2 214 117 A2 | 8/2010 |

* cited by examiner

*Primary Examiner* — Eric Cardwell

(57) ABSTRACT

In high security devices, like smart cards, the on-board software may be embedded in ROM (read only memory). But, based on flexibility arguments, non-volatile flash memory based software storage can be more preferred. This invention describes a method to recover from a situation of data loss on flash devices by combining the on-device available secure boot-loading with embedded physical unclonable functions (PUF), where the PUF provides the cryptographic key for starting the data recovery procedure.

20 Claims, 6 Drawing Sheets

PUF BASED BOOT-LOADING FOR DATA RECOVERY ON SECURE FLASH DEVICES

FIELD

The described embodiments relate generally to methods and systems that provide for data recovery on secure flash devices, and more particularly to methods and systems that provide for data recovery on secure flash devices using PUF (physical unclonable function) based boot-loading.

BACKGROUND

Microcontrollers with non-volatile flash memory are mostly used for SIM (subscriber identification module) card applications as they provide high flexibility in configuration and offer the option for late software (SW) loading, as compared to microcontrollers being equipped with ROM (read-only memory) only. ROM based programming takes place during silicon production and cannot be altered later.

For high security ICs (integrated circuits) used in, for example, banking/payment and e-Government (or Electronic Government), the ROM based solutions is up to now preferred, as altering the ROM and by that manipulating the software (SW) is regarded as very hard to impossible after production of silicon. Meanwhile additional security mechanisms have also been invented to mitigate the risk of using Flash instead of ROM for high security devices.

One risk for flash memory based secure devices is the loss (and/or corruption) of data incurred by exposure to extreme environments, such as high temperature or high radiation. For such cases high security devices have protection mechanisms implemented, which prevent them from operating if significant memory parts are lost (i.e., the device enters a "secured" state and cannot be used anymore). Then it is necessary to recover data to the flash memory containing the missing (or corrupted) data, so that the flash memory based secure device can recover from the "secured" state to a normal operating state.

Additionally, as high security devices increasingly migrate into systems and as such are embodied on electronic devices (such as smart phones, tablets) or built in into meters, the loss of data would make the whole electronic device not function any more. The cost of such electronic devices is by far higher as compared to, say for example, a smart card. Therefore, not being able to recover from a "secured" state (due to data loss and/or corruption) is not likely to be an acceptable option.

Therefore, it is desirable to have methods and systems that provide for data recovery on secure flash devices, when data loss and/or corruption has occurred on the flash memory.

SUMMARY

In high security devices, like smart cards, the on-board software may be embedded in ROM (read only memory). But, based on flexibility arguments, non-volatile flash memory based software storage can be more preferred. In some embodiments, this invention describes a method to recover from a situation of data loss on flash devices by combining the on-device available secure boot-loading with embedded physical unclonable functions (PUF), where the PUF provides the cryptographic key for starting the data recovery procedure.

In some embodiments, the idea of PUF (Physical Unclonable Function) technology is to use physical device properties to extract a unique random pattern. The claim of PUF is realized by a system which answers to a specific challenge as input with a unique random response. The process is repeatable but unique for a given physical device. Other devices will respond on the same challenge with a different unique response. Thus, a PUF response is proven unique to a given device. In some embodiments, the unique random response can be used for the creation of cryptographic keys.

In some embodiments, the present invention discloses methods and systems that combine a PUF with a high security flash memory based device in order to provide the device with a unique random pattern, which can be used to derive a device unique cryptographic key. This cryptographic key is stored intrinsically in the PUF and cannot be erased. Therefore, the high secure device has a cryptographic key available, even when data loss or corruption has occurred on the flash memory. This cryptographic key can, in turn, provide for data recovery on this secure flash device, even though the flash memory contained in this secure flash devices has suffered data loss or data corruption.

The present invention provides for a method for recovering corrupted data on a device using a PUF (physical unclonable function) located on the device, the method comprising: (a) transmitting, by the device, to a server a request for data recovery and a unique device identifier that is unalterably stored in the device; (b) receiving, by the device, a PUF challenge transmitted by the server in response to the request for data recovery and the unique device identifier, wherein the PUF challenge is used to determine a restore key; (c) transmitting, by the device, to the server the unique device identifier encrypted by the restore key in response to the PUF challenge; (d) receiving, by the device, a device restore data encrypted by the restore key, wherein the device restore data is transmitted by the server in response to the server authenticating the unique device identifier with the restore key stored on the server together with the PUF challenge after a first device initialization at a protected production site.

In some embodiments, the method further comprises: decrypting, by the device, the device restore data; using, by the device, the decrypted device restore data to recover corrupted data on the device.

In some embodiments, the method further comprises: using recovered data for boot-loading the device.

In some embodiments, the PUF challenge is transmitted by the server together with a random number, wherein the restore key is determined using the PUF challenge, wherein both the unique device identifier and the random number are encrypted by the restore key, and transmitted, by the device, to the server.

In some embodiments, the PUF challenge is transmitted by the server together with a random number and a time stamp, wherein the restore key is determined using the PUF challenge, wherein the unique device identifier, the random number, and the time stamp are all encrypted by the restore key, and transmitted, by the device, to the server.

In some embodiments, the restore key is an output of a hash function that has the PUF challenge and PUF challenge results as inputs.

In some embodiments, the PUF comprises an SRAM (static random access memory) PUF.

In some embodiments, the method further comprises: authenticating, by the device, the server before the device transmits to the server the request for data recovery and the unique device identifier.

In some embodiments, the authenticating the server comprises: transmitting, by the device, to the server a request for host authentication of the server; receiving, by the device, an authentication response from the server; determining, by the device, that the authentication response is valid.

In some embodiments, the present invention provides for a device configured to perform the following method steps: (a) transmitting, by the device, to a server a request for data recovery and a unique device identifier that is unalterably stored in the device; (b) receiving, by the device, a PUF challenge transmitted by the server in response to the request for data recovery and the unique device identifier, wherein the PUF challenge is used to determine a restore key; (c) transmitting, by the device, to the server the unique device identifier encrypted by the restore key in response to the PUF challenge; (d) receiving, by the device, a device restore data encrypted by the restore key, wherein the device restore data is transmitted by the server in response to the server authenticating the unique device identifier with the restore key stored on the server together with the PUF challenge after a first device initialization at a protected production site.

In some embodiments, the present invention provides for a server configured to perform the following method steps: (a) transmitting, by a device, to the server a request for data recovery and a unique device identifier that is unalterably stored in the device; (b) receiving, by the device, a PUF challenge transmitted by the server in response to the request for data recovery and the unique device identifier, wherein the PUF challenge is used to determine a restore key; (c) transmitting, by the device, to the server the unique device identifier encrypted by the restore key in response to the PUF challenge; (d) receiving, by the device, a device restore data encrypted by the restore key, wherein the device restore data is transmitted by the server in response to the server authenticating the unique device identifier with the restore key stored on the server together with the PUF challenge after a first device initialization at a protected production site.

In some embodiments, the present invention provides for a non-transitory computer program product comprising computer-executable instructions for carrying out the following method steps: (a) transmitting, by a device, to a server a request for data recovery and a unique device identifier that is unalterably stored in the device; (b) receiving, by the device, a PUF challenge transmitted by the server in response to the request for data recovery and the unique device identifier, wherein the PUF challenge is used to determine a restore key; (c) transmitting, by the device, to the server the unique device identifier encrypted by the restore key in response to the PUF challenge; (d) receiving, by the device, a device restore data encrypted by the restore key, wherein the device restore data is transmitted by the server in response to the server authenticating the unique device identifier with the restore key stored on the server together with the PUF challenge after a first device initialization at a protected production site.

The present invention also provides for a device configured for recovering corrupted data on the device, the device comprising: (a) a non-volatile memory; (b) a PUF (physical unclonable function); (c) a processor. The processor is configured to perform the following steps: (i) in response to corruption of data in the non-volatile memory, transmitting to a server a request for data recovery and a unique device identifier that is unalterably stored in the device, (ii) receiving a PUF challenge associated with the PUF of the device transmitted by the server in response to the request for data recovery and the unique device identifier, wherein the PUF challenge is used to determine a restore key, (iii) in response to the PUF challenge, transmitting to the server the unique device identifier encrypted by the restore key, (iv) receiving a device restore data encrypted by the restore key, wherein the device restore data is transmitted by the server in response to the server authenticating the unique device identifier with the restore key stored on the server together with the PUF challenge after a first device initialization at a protected production site.

In some embodiments, the processor is further configured to perform the following additional steps: decrypting the device restore data, using the decrypted device restore data to recover corrupted data on the device.

In some embodiments, the processor is further configured to perform the following additional steps: using recovered data for boot-loading the device.

In some embodiments, the PUF challenge is transmitted by the server together with a random number, wherein the restore key is determined using the PUF challenge, wherein both the unique device identifier and the random number are encrypted by the restore key, and transmitted, by the device, to the server.

In some embodiments, the restore key is an output of a hash function that has the PUF challenge and PUF challenge results as inputs.

In some embodiments, the PUF comprises an SRAM (static random access memory) PUF.

The present invention further provides for a server configured for providing recovery data to a device that has corrupted data and a PUF (physical unclonable function), wherein the server is configured to perform the following steps: (a) receiving, from the device, a request for data recovery and a unique device identifier, (b) transmitting, to the device, a PUF challenge associated with the PUF of the device in response to the request for data recovery and the unique device identifier, wherein the PUF challenge is used to determine a restore key associated with the PUF challenge, wherein the restore key is stored on the server together with the PUF challenge after a first device initialization at a protected production site, (c) receiving, from the device, the unique device identifier encrypted by the restore key associated with the PUF challenge, (d) authenticating the device using the encrypted unique identifier together with the restore key, (e) in response to authenticating the restore key to be valid, transmitting a device restore data encrypted by the restore key to the device.

In some embodiments, the server is further configured to perform the following authentication steps prior to receiving from the device a request for data recovery and a unique device identifier: receiving from the device a request for host authentication of the server, transmitting to the device an authentication response.

The above summary is not intended to represent every example embodiment within the scope of the current or future Claim sets. Additional example embodiments are discussed within the Figures and Detailed Description below.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
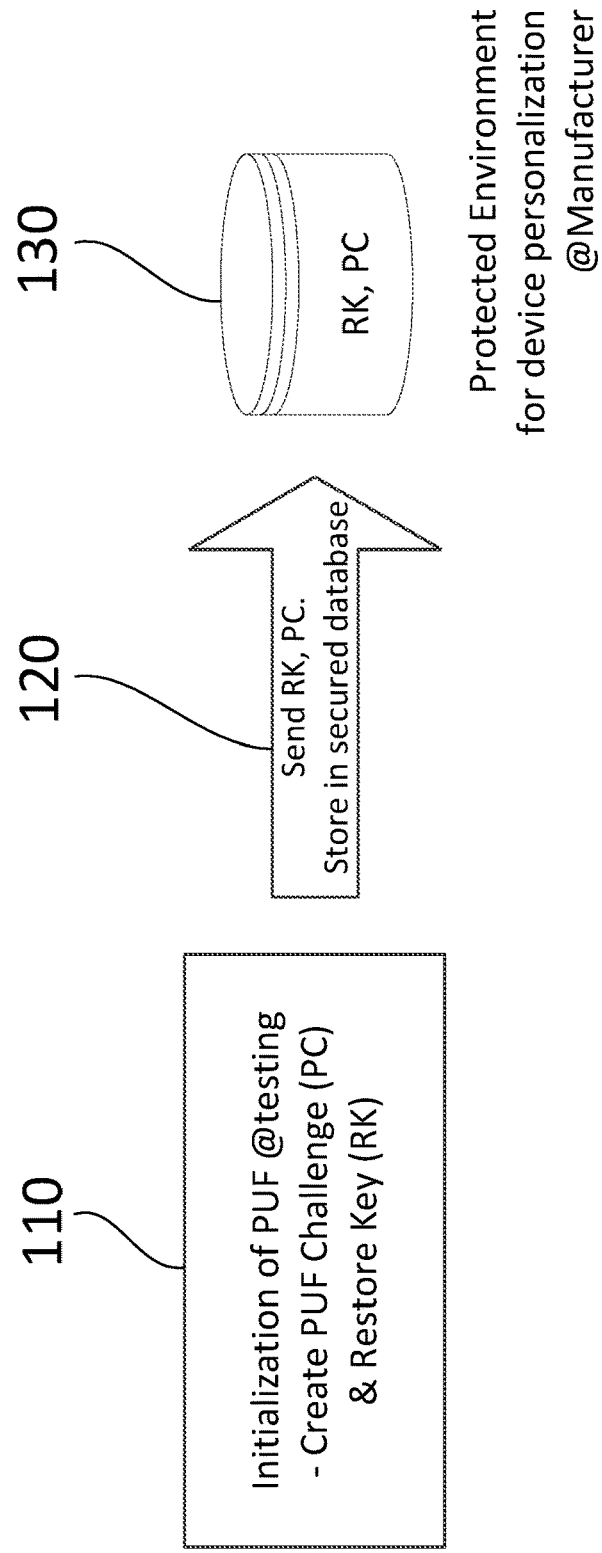
FIG. 1 shows an embodiment of a method and system for storing vital data of a device in a central and secure database, in accordance with some example embodiments of the invention.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

In high security devices, such as smart cards, ROM (read only memory) may be used to embed the on-board software. Similarly, non-volatile flash memory may also be used to embed and store the software, and can be more preferred for flexibility and other reasons. However, flash memory may suffer data loss and/or corruption, and lack a key for starting the data recovery procedure. As such, in some embodiments, this invention describes a method to recover from a data loss and/or corruption scenario by combining the on-device available secure boot-loading with embedded physical unclonable functions (PUF), where the PUF provides the cryptographic key for starting the data recovery procedure.

In some embodiments, the PUF (Physical Unclonable Function) technology uses physical device properties to extract a unique random pattern. Then the PUF can provide a unique random response to a specific PUF challenge that is presented to a system. This process is repeatable but the response is unique for a given physical device. Therefore, the response to the same PUF challenge will be different for other physical devices, but again that response will be unique to that physical device. In other words, a PUF response is unique to a given device. In some embodiments, the unique random response can be used for the creation of cryptographic keys.

In some embodiments, the present invention discloses methods and systems that combine a PUF with a high security flash memory based device in order to provide the device with a unique random pattern, which can be used to derive a device unique cryptographic key. This cryptographic key is stored intrinsically in the PUF and cannot be erased. Now, even when the flash memory suffers a data loss and/or corruption, there is a cryptographic key available via the PUF. Because this cryptographic key is stored intrinsically in the PUF and cannot be erased, this cryptographic key can, in turn, provide for data recovery on this secure flash device.

Figure 2:
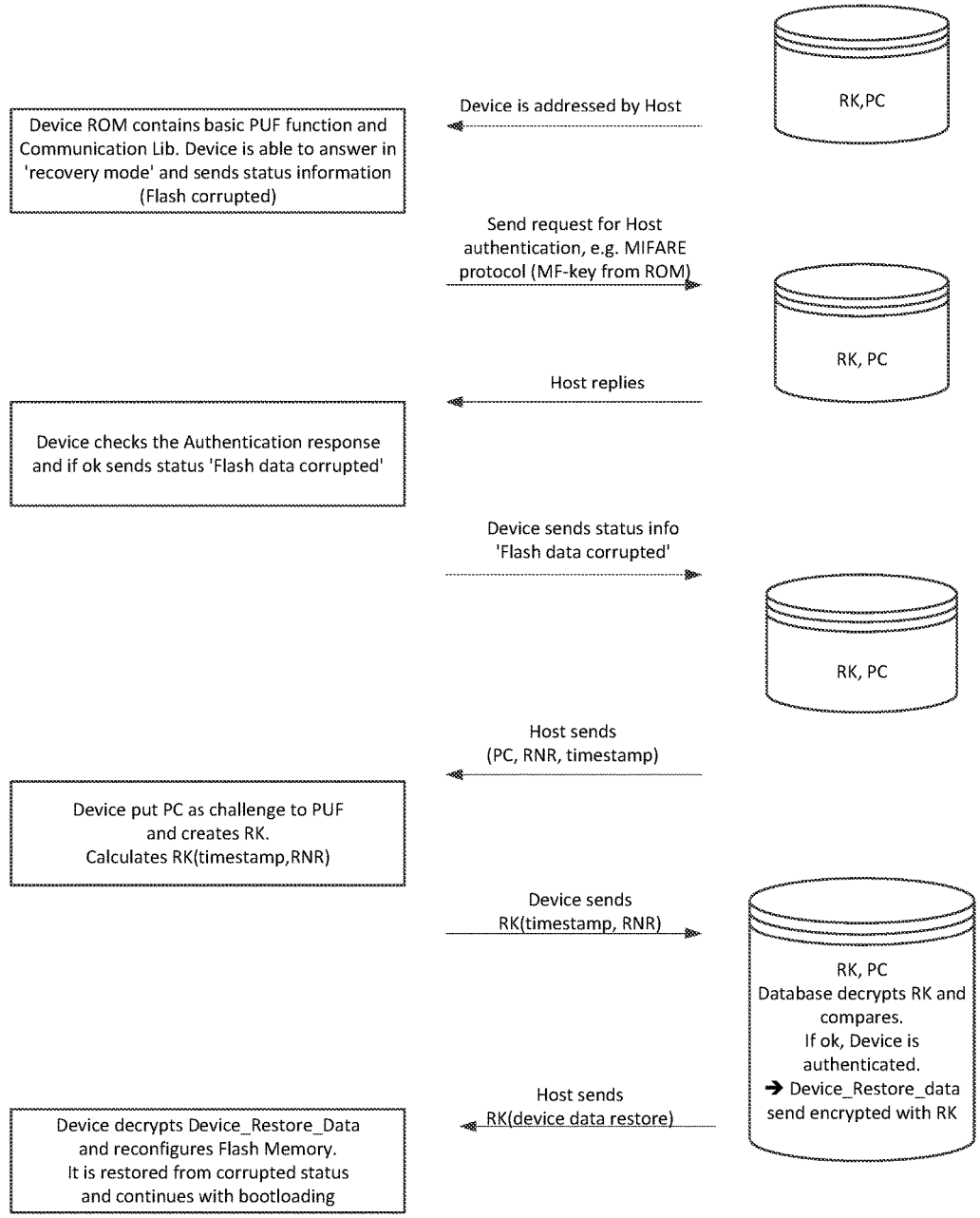
FIG. 2 shows an embodiment of a method and system for data recovery of a corrupted flash memory based on PUF (Physical Unclonable Function) in a device, in accordance with some example embodiments of the invention.

FIG. 1 and FIG. 2 together show an embodiment of a method and system that can combine a PUF with a high security flash memory based device in order to provide the device with a unique random pattern, which can be used to derive a device unique cryptographic key. FIG. 1 and FIG. 2 together further show that the method and system can provide for data recovery on the secure flash device, when the flash memory has suffered a data loss and/or corruption, because there is a cryptographic key available via the PUF. In particular, FIG. 1 shows a method and system for storing vital data of a device in a central and secure database, while FIG. 2 shows a method and system for data recovery of a corrupted flash memory based on PUF (Physical Unclonable Function) in the device.

As a pre-condition, FIGS. 1 and 2 assume that the high security device contains a micro-controller, a suitable cryptographic co-processors (not mandatory but useful for fast encryption/decryption for symmetric and asymmetric encryption) and a hardware based random number generator. Further it is assumed that these circuit parts work properly together. The device contains appropriate SW (software) in ROM (read only memory) to operate the circuit parts and is able to communicate with external host system in a restricted way (to be described below). Further the ROM SW provides means to download data and reprogram the flash, and the host system has a data image of the devices' flash as backup available. These backup data must not necessarily have the complete image available, but the data defined as 'mandatory basic'.

In order to prepare for such a data recovery method and system as shown in FIG. 2, some vital data of the device have to be first stored in a central and secured database. In some embodiments, the vital device data stored includes the PUF Challenge (PC) and the Recovery Key or Restore Key (RK). These keys, which include PC and RK, are created by the device during personalization in a high secure environment and then send to a host database. This shall be the only situation where the device shares these keys with the external world. The host database needs to provide support from security perspective to the high security device (cf. e.g. Common Criteria levels). The PC and RK pair should be prepared only for the emergency situation described in FIG. 2 and should not be used elsewhere. Also, other applications using the PUF must use a different challenge (for example, PC').

The above described procedure is shown in FIG. 1. Step 110 shows that the PUF Challenge (PC) and the Recovery Key or Restore Key (RK) are created when the PUF is initialized at testing. Next, step 120 shows that the high security device send RK and PC (which are the vital data of the device) to be stored in a secured host database. Then step 130 shows that RK and PC are stored in the secured host database. FIG. 1 also shows that all these steps are carried out during device personalization in a high secure (i.e., "protected") environment at a manufacturer.

FIG. 2 shows the method and system for data recovery based on PUF, after a flash in a high secure device has suffered data loss and/or data corruption.

In some embodiments, the method can begin by having a host (which has access to the secured host database containing RK and PC) addressing a device.

If the high security device happens to have a situation of data loss or corrupted data, the device can respond to the host with a request for the host to authenticate itself to the device. Since a flash in a high security device has suffered data loss and/or data corruption, this assumes, in some embodiments, that the device ROM contains basic PUF function and Communication Library. Then the device is able to answer in a 'recovery mode', and sends a status information (such as 'Flash corrupted') to the host. In some embodiments, the request for host authentication can be realized by a rather simple protocol (such as one used in MIFARE cards, where MIFARE covers proprietary technologies based upon various levels of the ISO/IEC 14443 Type A 13.56 MHz contactless smart card standard). Here, the respective data for this basic authentication must have been stored in ROM.

Next, the host replies to the device, in response to the request for the host to authenticate itself to the device.

The device checks the authentication response from the host. If the host authentication was successful, then the device sends a status 'Flash data corrupted' together with a unique device identifier to the host.

Next, the host responds with the PUF Challenge (PC) of the device in order to authenticate the device to the host. In some embodiments, the host responds with the PC of the device and adds a random number (RNR) in order to authenticate the device to the host. In other embodiments, the host responds with the PC of the device and adds a random number (RNR) and a time stamp in order to authenticate the device to the host.

The device puts the PUF Challenge (PC) as a challenge to the PUF and creates out of the PUF response the Recovery Key or Restore Key (RK). It then sends the RK back to the host. In some embodiments, it then encrypts the unique device identifier with the RK and sends it back to the host. In other embodiments, it then encrypts the random number with the RK and sends it back to the host. In still other embodiments, it then encrypts the random number and the time stamp with the RK and sends it back to the host. In further embodiments, it then encrypts the RK and sends it back to the host.

Next, the host decrypts the message with the RK. If the RK is correct, then the device authentication versus the host has succeeded. In some embodiments, the host decrypts the message with the RK and checks the unique device identifier. If unique device identifier is identical to the one sent, then the device authentication versus the host has succeeded. In other embodiments, the host decrypts the message with the RK and checks the random number (RNR). If RNR is identical to the one sent, then the device authentication versus the host has succeeded. In still other embodiments, the host decrypts the message with the RK and checks the random number (RNR) and the time stamp. If RNR and the time stamp are identical to the one sent, then the device authentication versus the host has succeeded.

Following a successful authentication, a device restore data encrypted by the RK is sent to the device. In some embodiments, following a successful authentication, an encrypted device restore data is sent to the device. In some embodiments, following a successful authentication, an unencrypted device restore data is sent to the device.

The device receives the encrypted 'device restore data' download, decrypts the encrypted 'device restore data' download, and reconfigures the flash memory. The device is restored from the corrupted status, and continues with bootloading. In some embodiments, the device receives the 'device restore data' download, and the device can use the download secured by the RK or a derived one to obtain missing data and finally repair the data in the flash, where the details of the loader routine can depend on the specific implementation. In other embodiments, the device receives the encrypted 'device restore data' download, and the device can decrypt the encrypted 'device restore data' download to repair the data in the flash. In still other embodiments, the device receives the unencrypted 'device restore data' download, and the device can use the unencrypted 'device restore data' download to repair the data in the flash.

When the process shown in FIG. 2 has been executed in the above described sequence, the flash containing corrupted data has been repaired. In some embodiments, this means that the device is restored from a corrupted status to a normal operating state. In other embodiments, this means that the device is restored from a corrupted status, and continues with boot-loading.

Figure 3:
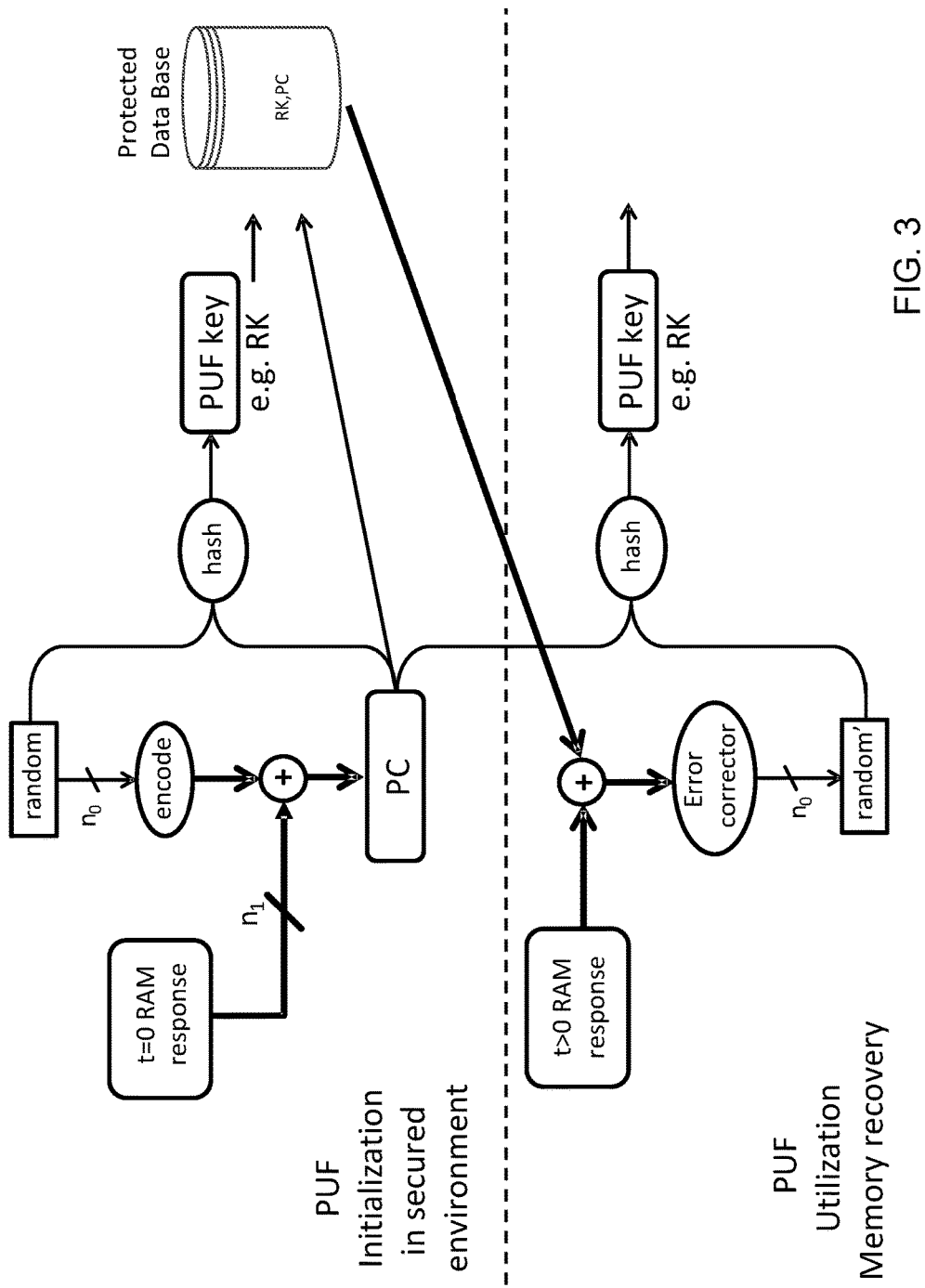
FIG. 3 shows an embodiment of a method and system for initializing the PUF at final production testing and for retrieving the PUF key at a later time, in accordance with some example embodiments of the invention.

FIG. 3 shows an embodiment of a method and system for initializing the PUF at final production testing and for retrieving the PUF key at a later time, in accordance with some example embodiments of the invention.

FIG. 3 shows that a PUF Challenge (PC) and a PUF key (which can be a Recovery Key or Restore Key (RK)) can be created during PUF initialization in a high secure (i.e., "protected") environment. FIG. 3 also shows that the PUF key (which can be the Recovery Key or Restore Key (RK)) can be an output of a hash function that has the PUF challenge and PUF challenge results as inputs. FIG. 3 further shows that the PC and RK can be stored in a secured "protected") host database.

FIG. 3 shows that later, during the PUF key recovery process, the device can put the PUF Challenge (PC) as a challenge to the PUF and create out of the PUF response the PUF key (which can be the Recovery Key or Restore Key (RK)).

Figure 4:
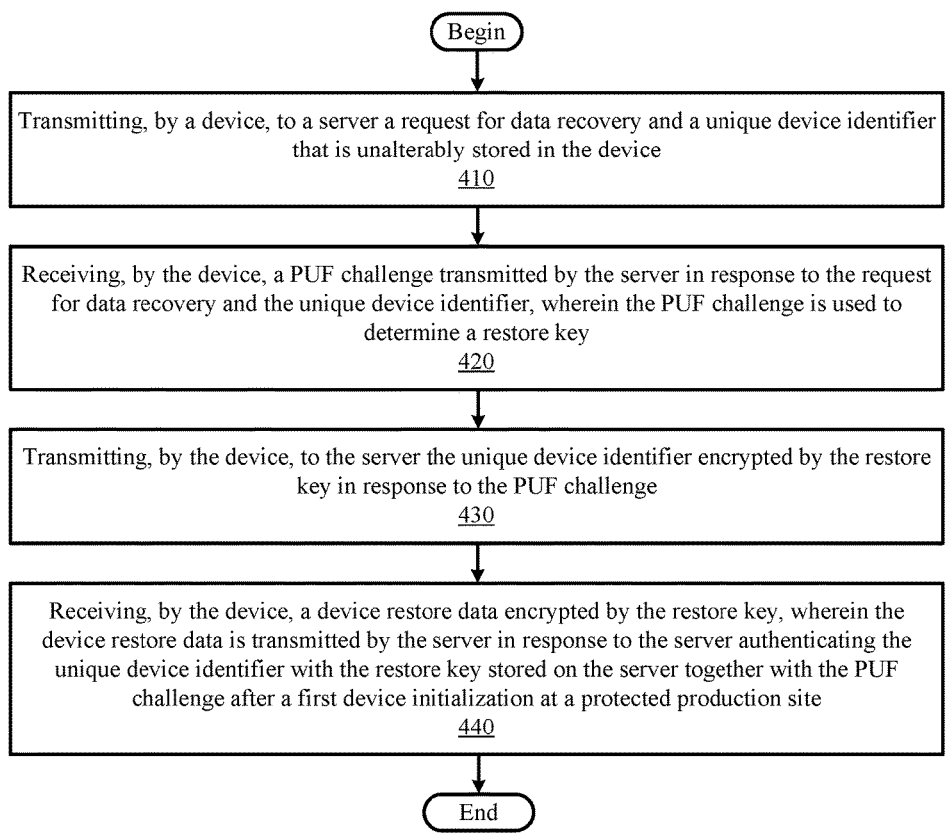
FIG. 4 shows an embodiment of a method for recovering corrupted data on a device using a PUF (physical unclonable function) located on the device, in accordance with some example embodiments of the invention.

FIG. 4 shows a flow chart of method steps for recovering corrupted data on a device using a PUF (physical unclonable function) located on the device, in accordance with some example embodiments. As shown in FIG. 4, the method 400 begins at step 410, where the method transmits, by the device, to a server a request for data recovery and a unique device identifier that is unalterably stored in the device. Then, at step 420, the method receives, by the device, a PUF challenge transmitted by the server in response to the request for data recovery and the unique device identifier, wherein the PUF challenge is used to determine a restore key. Next, at step 430, the method transmits, by the device, to the server the unique device identifier encrypted by the restore key in response to the PUF challenge. Then, at step 440, the method receives, by the device, a device restore data encrypted by the restore key, wherein the device restore data is transmitted by the server in response to the server authenticating the unique device identifier with the restore key stored on the server together with the PUF challenge after a first device initialization at a protected production site.

Figure 5:
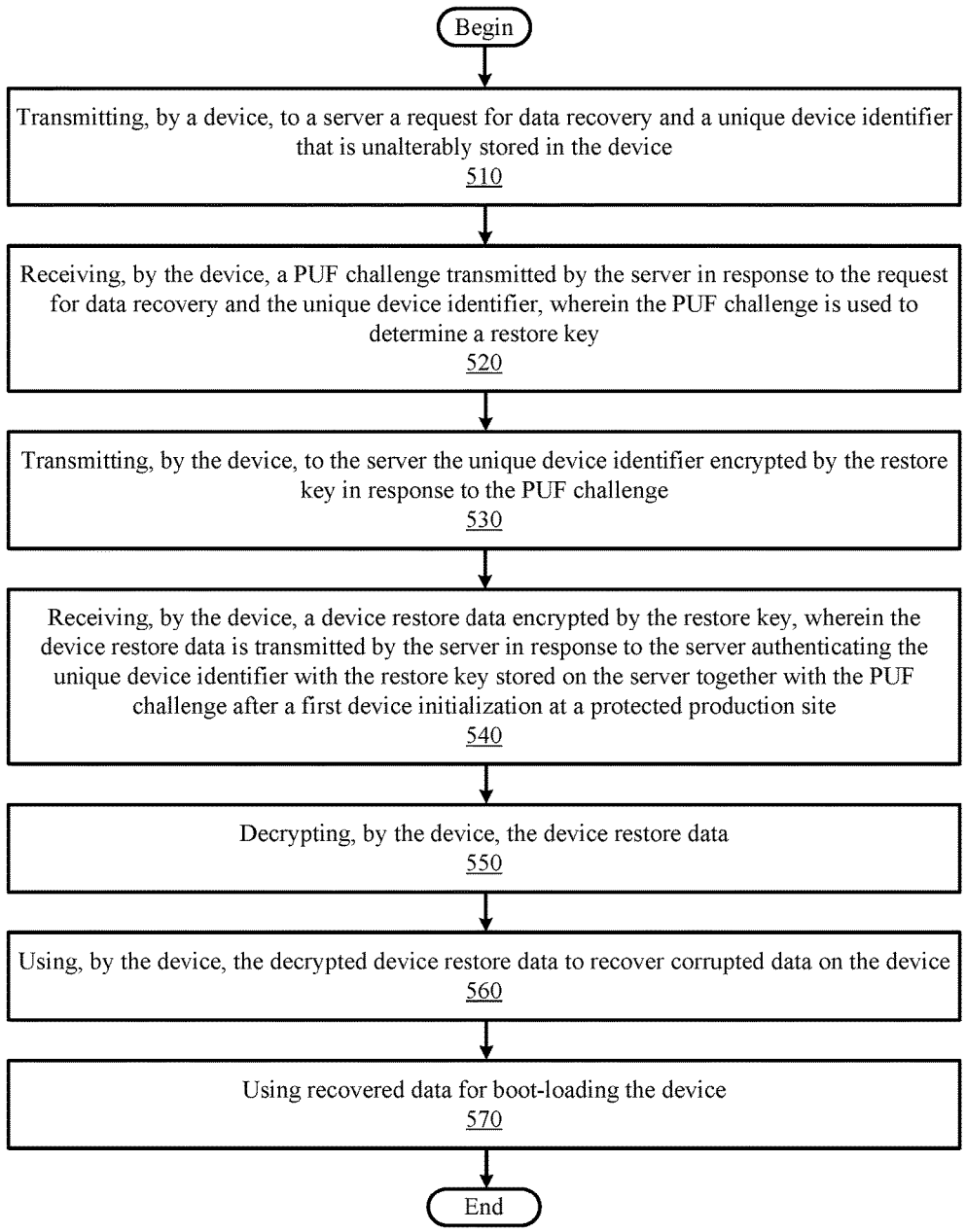
FIG. 5 shows an embodiment of a method for recovering corrupted data on a device using a PUF (physical unclonable function) located on the device for boot-loading the device, in accordance with some example embodiments of the invention.

FIG. 5 shows a flow chart of method steps for recovering corrupted data on a device using a PUF (physical unclonable function) located on the device for boot-loading the device, in accordance with some example embodiments. The embodiment method shown in FIG. 5 is very similar to the embodiment method shown in FIG. 4, except for additional method steps 550, 560, and 570 included in the embodiment method of FIG. 5. As shown in FIG. 5, the method 500 begins at step 510, where the method transmits, by the device, to a server a request for data recovery and a unique device identifier that is unalterably stored in the device. Then, at step 520, the method receives, by the device, a PUF challenge transmitted by the server in response to the request for data recovery and the unique device identifier, wherein the PUF challenge is used to determine a restore key. Next, at step 530, the method transmits, by the device, to the server the unique device identifier encrypted by the restore key in response to the PUF challenge. Continuing to step 540, the method receives, by the device, a device restore data encrypted by the restore key, wherein the device restore data is transmitted by the server in response to the server authenticating the unique device identifier with the restore key stored on the server together with the PUF challenge after a first device initialization at a protected production site. Then, at step 550, the method decrypts, by the device, the device restore data. Next, at step 560, the method uses, by the device, the decrypted device restore data to recover corrupted data on the device. Then, at step 570, the method uses recovered data for boot-loading the device. In some embodiments (not shown in FIG. 5), the method can use recovered data for other purposes.

Figure 6:
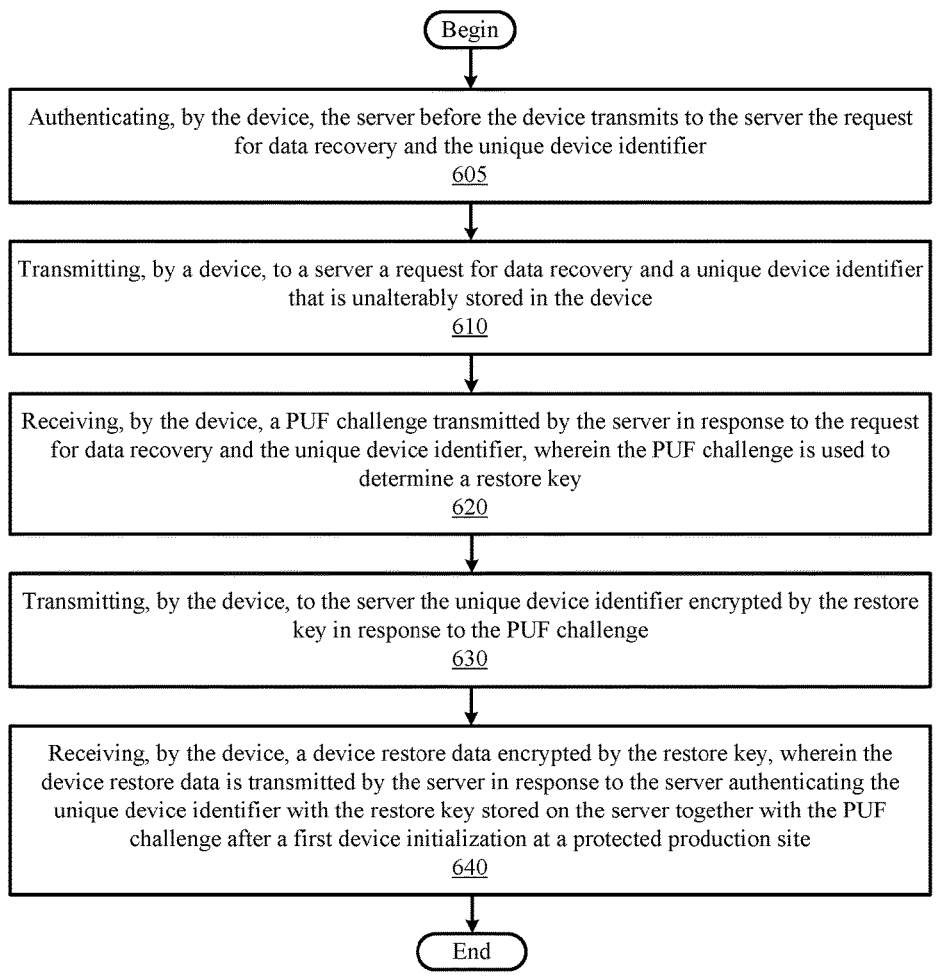
FIG. 6 shows an embodiment of a method for recovering corrupted data on a device using a PUF (physical unclonable function) located on the device, wherein the device first authenticates the server, in accordance with some example embodiments of the invention.

FIG. 6 shows a flow chart of method steps for recovering corrupted data on a device using a PUF (physical unclonable function) located on the device, wherein the device first authenticates the server, in accordance with some example embodiments. The embodiment method shown in FIG. 6 is very similar to the embodiment method shown in FIG. 4, except for an additional method step 605 included in the embodiment method of FIG. 6. As shown in FIG. 6, the method 600 begins at step 605, where the method authenticates, by the device, a server before the device transmits to the server the request for data recovery and the unique device identifier. Next, at step 610, the method transmits, by the device, to a server a request for data recovery and a unique device identifier that is unalterably stored in the device. Then, at step 620, the method receives, by the device, a PUF challenge transmitted by the server in response to the request for data recovery and the unique device identifier, wherein the PUF challenge is used to determine a restore key. Next, at step 630, the method transmits, by the device, to the server the unique device identifier encrypted by the restore key in response to the PUF challenge. Continuing to step 640, the method receives, by the device, a device restore data encrypted by the restore key, wherein the device restore data is transmitted by the server in response to the server authenticating the unique device identifier with the restore key stored on the server together with the PUF challenge after a first device initialization at a protected production site. In some embodiments (not shown in FIG. 6), the method can be recovering corrupted data for boot-loading the device by including additional method steps that are similar to steps 550, 560, and 570 shown in FIG. 5.

In some example embodiments, the instructions described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the instructions illustrated herein and data and instructions associated therewith are stored in respective storage devices, which are implemented as one or more non-transient machine or computer-readable or computer-usable storage media or mediums. Such computer-readable or computer-usable storage medium or media is (are) considered to be part of an article (or article of manufacture). An article or article of manufacture can refer to any manufactured single component or multiple components. The non-transient machine or computer-usable media or mediums as defined herein excludes signals, but such media or mediums may be capable of receiving and processing information from signals and/or other transient mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs).

In one example, one or more blocks or steps discussed herein are automated. In other words, apparatus, systems, and methods occur automatically. The terms automated or automatically (and like variations thereof) mean controlled operation of an apparatus, system, and/or process using computers and/or mechanical/electrical devices without the necessity of human intervention, observation, effort and/or decision.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The various aspects, embodiments, implementations or features of the described embodiments can be used separately or in any combination. Various aspects of the described embodiments can be implemented by software, hardware or a combination of hardware and software. Some of the described embodiments can also be embodied as computer readable code on a non-transitory computer readable medium. The computer readable medium is defined as any data storage device that can store data which can thereafter be read by a computer system. Examples of the computer readable medium include read-only memory, random-access memory, CD-ROMs, HDDs (hard disk drives), SSDs (solid-state drives), DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for recovering lost or corrupted data on a device using a PUF (physical unclonable function) located on the device, the method comprising:
   determining that a memory on the device has suffered unintentionally lost or corrupted data;
   transmitting, by the device, to a server a request for data recovery and a unique device identifier that is unalterably stored in the device;
      receiving, by the device, a PUF challenge transmitted by the server in response to the request for data recovery and the unique device identifier, wherein the PUF challenge is used to determine a restore key;
      transmitting, by the device, to the server the unique device identifier encrypted by the restore key in response to the PUF challenge;
      receiving, by the device, a device restore data encrypted by the restore key, wherein the device restore data is transmitted by the server in response to the server authenticating the unique device identifier with the restore key stored on the server together with the PUF challenge after a first device initialization at a protected production site;
   decrypting, by the device, the device restore data; and
   using, by the device, the decrypted device restore data to replace the lost or corrupted data on the memory.

2. The method of claim 1, wherein the memory is a flash memory and using, by the device, the decrypted device restore data to recover the lost or corrupted data on the device further comprises programming the flash memory with the decrypted device restore data.

3. The method of claim 2 further comprising:
   using the recovered data for boot-loading the device.

4. The method of claim 1,
   wherein the PUF challenge is transmitted by the server together with a random number,
   wherein the restore key is determined using the PUF challenge,
   wherein both the unique device identifier and the random number are encrypted by the restore key, and transmitted, by the device, to the server.

5. The method of claim 1,
   wherein the PUF challenge is transmitted by the server together with a random number and a time stamp,
   wherein the restore key is determined using the PUF challenge,
   wherein the unique device identifier, the random number, and the time stamp are all encrypted by the restore key, and transmitted, by the device, to the server.

6. The method of claim 1,
   wherein the restore key is an output of a hash function that has the PUF challenge and PUF challenge results as inputs.

7. The method of claim 1,
   wherein the PUF comprises an SRAM (static random access memory) PUF.

8. The method of claim 1 further comprising:
   authenticating, by the device, the server before the device transmits to the server the request for data recovery and the unique device identifier.

9. The method of claim 8, wherein authenticating the server comprises:
   transmitting, by the device, to the server a request for host authentication of the server;
   receiving, by the device, an authentication response from the server;
   determining, by the device, that the authentication response is valid.

10. A device configured to perform the method steps of claim 1.

11. A server configured to perform the method steps of claim 1.

12. A non-transitory computer program product comprising computer-executable instructions for carrying out the steps of a method as claimed in claim 1.

13. A device configured for recovering corrupted data on the device, the device comprising:
   a non-volatile memory;
   a PUF (physical unclonable function);
   a processor, wherein the processor is configured to perform the following steps:
   determining that data stored on the non-volatile memory has been unintentionally lost or corrupted;
   in response to determining that the data stored on the non-volatile memory has been unintentionally lost or corrupted, transmitting to a server a request for data recovery and a unique device identifier that is unalterably stored in the device,
      receiving a PUF challenge associated with the PUF of the device transmitted by the server in response to the request for data recovery and the unique device identifier, wherein the PUF challenge is used to determine a restore key,
      in response to the PUF challenge, transmitting to the server the unique device identifier encrypted by the restore key,
      receiving a device restore data encrypted by the restore key, wherein the device restore data is transmitted by the server in response to the server authenticating the unique device identifier with the restore key stored on the server together with the PUF challenge after a first device initialization at a protected production site, wherein the encrypted device restore data is decrypted and used to replace the lost or corrupted data stored in the non-volatile memory.

14. The device of claim 13, wherein the processor is further configured to perform the following additional steps:
   decrypting the device restore data,
   using the decrypted device restore data to recover corrupted data on the device.

15. The device of claim 14, wherein the processor is further configured to perform the following additional steps:
   using the recovered data for boot-loading the device.

16. The device of claim 13,
   wherein the PUF challenge is transmitted by the server together with a random number,
   wherein the restore key is determined using the PUF challenge,
   wherein both the unique device identifier and the random number are encrypted by the restore key, and transmitted, by the device, to the server.

17. The device of claim 13,
wherein the restore key is an output of a hash function that has the PUF challenge and PUF challenge results as inputs.

18. The device of claim 13,
wherein the PUF comprises an SRAM (static random access memory) PUF.

19. A server configured for providing recovery data to a device that has corrupted data and a PUF (physical unclonable function), wherein the server is configured to perform the following steps:
receiving, from the device, a request for data recovery to recover unintentionally lost or corrupted data stored on a memory of the device, and a unique device identifier,
transmitting, to the device, a PUF challenge associated with the PUF of the device in response to the request for data recovery and the unique device identifier, wherein the PUF challenge is used to determine a restore key associated with the PUF challenge, wherein the restore key is stored on the server together with the PUF challenge after a first device initialization at a protected production site,
receiving, from the device, the unique device identifier encrypted by the restore key associated with the PUF challenge,
authenticating the device using the encrypted unique identifier together with the restore key,
in response to authenticating the restore key to be valid, transmitting a device restore data encrypted by the restore key to the device to be decrypted and to replace the lost or corrupted data on the device.

20. The server of claim 19, wherein the server is further configured to perform the following authentication steps prior to receiving from the device a request for data recovery and a unique device identifier:
receiving from the device a request for host authentication of the server,
transmitting to the device an authentication response.

* * * * *